United States Patent
He et al.

(10) Patent No.: US 12,061,876 B2
(45) Date of Patent: *Aug. 13, 2024

(54) EFFICIENT TRANSFORMER LANGUAGE MODELS WITH DISENTANGLED ATTENTION AND MULTI-STEP DECODING

(71) Applicant: MICROSOFT TECHNOLOGY LICENSING, LLC, Redmond, WA (US)

(72) Inventors: Pengcheng He, Sammamish, WA (US); Xiaodong Liu, Redmond, WA (US); Jianfeng Gao, Woodinville, WA (US); Weizhu Chen, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/078,530

(22) Filed: Dec. 9, 2022

(65) Prior Publication Data
US 2023/0222295 A1   Jul. 13, 2023

Related U.S. Application Data

(63) Continuation of application No. 16/910,508, filed on Jun. 24, 2020, now Pat. No. 11,526,679.

(60) Provisional application No. 63/035,315, filed on Jun. 5, 2020, provisional application No. 63/015,007, filed on Apr. 24, 2020.

(51) Int. Cl.
*G06F 40/40* (2020.01)
*G06N 20/00* (2019.01)

(52) U.S. Cl.
CPC ............ *G06F 40/40* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 2019/0130273 A1* | 5/2019 | Keskar | G06N 3/044 |
| 2021/0149993 A1* | 5/2021 | Torres | G06F 40/295 |
| 2021/0173841 A1* | 6/2021 | Kotnis | G06F 16/322 |
| 2021/0174023 A1* | 6/2021 | Gao | G06F 40/35 |
| 2021/0232773 A1* | 7/2021 | Wang | G06F 18/21 |
| 2021/0264109 A1* | 8/2021 | Srinivasan | G06F 40/44 |

* cited by examiner

*Primary Examiner* — Nafiz E Hoque
(74) *Attorney, Agent, or Firm* — Workman Nydegger

(57) ABSTRACT

Systems and methods are provided for facilitating the building and use of natural language understanding models. The systems and methods identify a plurality of tokens and use them to generate one or more pre-trained natural language models using a transformer. The transformer disentangles the content embedding and positional embedding in the computation of its attention matrix. Systems and methods are also provided to facilitate self-training of the pre-trained natural language model by utilizing multi-step decoding to better reconstruct masked tokens and improve pre-training convergence.

20 Claims, 11 Drawing Sheets

| Model | Model Size | CoLA Mcc | QQP F1/Acc | MNLI-m/mm Acc | SST-2 Acc | STS-B Acc | QNLI Acc | RTE Acc | MRPC Acc |
|---|---|---|---|---|---|---|---|---|---|
| BERT$_{large}$ | 335M | 60.6 | 91.3 | 86.6/- | 93.2 | 90.0 | 92.3 | 70.4 | 88.0 |
| RoBERTa$_{large}$ | 335M | 68.0 | 92.2 | 90.2/90.2 | 96.4 | 92.4 | 93.9 | 86.6 | 90.9 |
| XLNet$_{large}$ | 360M | 69.0 | 92.3 | 90.8/90.8 | 97.0 | 92.5 | 94.9 | 85.9 | 90.8 |
| DeBERTa$_{large}$ | 390M | 69.5 | 92.3 | 91.1/91.1 | 96.5 | 92.5 | 95.3 | 88.1 | 92.5 |

FIG. 3

| Model | MNLI-m/mm (Acc) | SQuAD v1.1 (F1/EM) | SQuAD v2.0 (F1/EM) |
|---|---|---|---|
| RoBERTa$_{large}$ | 87.6/- | 91.5/84.6 | 83.7/80.5 |
| XLNet$_{large}$ | 86.8/- | -/- | -/80.2 |
| DeBERTa$_{large}$ | 88.8/88.5 | 93.1/87.2 | 86.2/83.1 |

FIG. 4

EFFICIENT TRANSFORMER LANGUAGE MODELS WITH DISENTANGLED ATTENTION AND MULTI-STEP DECODING

CROSS-REFERENCE TO RELATED APPLICATIONS

This application is a continuation of U.S. patent application Ser. No. 16/910,508, filed on Jun. 24, 2020, and entitled, "EFFICIENT TRANSFORMER LANGUAGE MODELS WITH DISENTANGLED ATTENTION AND MULTI-STEP DECODING," which issued as U.S. Pat. No. 11,526,679 on Dec. 13, 2022, which claims the benefit of and priority to U.S. Provisional Patent Application Ser. No. 63/015,007, filed on Apr. 24, 2020, and entitled "EFFICIENT TRANSFORMER LANGUAGE MODELS WITH DISENTANGLED ATTENTION AND MULTI-STEP DECODING," as well as U.S. Provisional Patent Application Ser. No. 63/035,315, filed on Jun. 5, 2020, and entitled "DEBERTA: DECODING-ENHANCED BERT WITH A DISENTANGLED ATTENTION." All the foregoing applications are expressly incorporated herein by reference in their entireties.

BACKGROUND

Computers and computing systems have affected nearly every aspect of modern living. Computers are generally involved in work, recreation, healthcare, transportation, entertainment, household management, etc.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Some computers are configured to make predictions based on machine learned models and can be used to analyze and predict complex systems such as financial markets, market personalization, facial recognition, and natural language.

There are traditionally three types of main architectures to compose a deep neural network model, e.g. convolution neural network (CNN), recurrent neural network (RUN) and transformer network. A deep neural network model may comprise any combination of one or more of the three main architectures.

The transformer architecture is currently preferred in natural language processing (NLP) because this structure allows for long range dependencies between words or tokens within a series. The general transformer structure within this architecture is made up of both an encoder and decoder. In some instances, the encoders and decoders are composed of several corresponding encoding layers and decoding layers, respectively.

Within each encoding and decoding layer is an attention mechanism. The attention mechanism, sometimes called self-attention or multi-head attention, relates tokens within a series of tokens to other tokens within the series. The self-attention mechanism allows the model to examine a word within a sentence and determine the relative importance other words within that sentence are to the word being examined. By way of example, in the sentence "The dog was so big it could not fit through the dog door," the self-attention mechanism attempts to relate the word "it" to other words in the sentence and identify the words that are most relevant to the word "it," such as "dog" and/or "door."

Currently, many NLPs are based on a transformer structure called Bi-directional Encoder Representation from Transformers (BERT). BERT introduces a method of relating tokens within a series to other tokens of that series bi-directionally, in different and opposing directions. It has been shown that BERT is able to predict relationships between words more accurately than unidirectional systems because, in order for a computing system to understand how a word operates within a sentence, the NLP must be able to model how that word relates to other words that occur both before and after the word in a sequence.

A pre-trained model produced by BERT can be utilized in a variety of contexts by performing task specific training and modification of the pre-trained model to each of the different contexts.

BERT's structure omits any decoder and typically utilizes one of two versions of a transformer encoder, resulting in two versions of BERT, namely, $BERT_{base}$ and $BERT_{large}$. The most notable difference between these versions is that $BERT_{base}$ has 12 encoding layers within the encoder and $BERT_{large}$ has 24 encoding layers within the encoder. Typically, $BERT_{large}$ outperforms $BERT_{base}$ in standard tests that measure the capabilities of the pre-trained model. Other pre-trained language models, which are based on BERT, follow a similar nomenclature (e.g. $RoBERTa_{base}$ and $RoBERTa_{large}$).

Despite the advances made possible with BERT, current BERT architectures have limitations that could benefit from additional improvements in the industry. For example, BERT is currently based on a transformer architecture, which is distinguished from sequence-to-sequence modeling, such that BERTs transformers are not well configured to track the sequential dependency of tokens being analyzed. Consequently, the sequencing information within a series of tokens being processed by a transformer can be lost. This sequential information includes, but is not limited to, the order in which words appear in a sentence, as well as the distance between two related or unrelated words. Existing Pretrained Language Models (PLM), such as BERT and other transformer based models, are not currently configured to fully incorporate this sequencing information, thereby limiting the accuracy of their results, and such that the predictions based on their results are less relevant and precise than they could be if they were to incorporate such information.

Some systems have attempted to address the foregoing problem (e.g., loss of sequencing information) by inserting position information, including a position bias, into the transformer structure to mimic the sequential dependency of other types of machine learning.

There are two types of position bias, namely, absolute position bias and relative position bias.

FIG. 1 illustrates the first type of position bias, absolute position bias. Absolute position is a sequential assignment of position to each token within a series. For example, a system or method that utilizes absolute position bias will assign the first token 101 a value of 0, the second token 102 a value of 1, the third token 103 a value of 2 and so on until each token within a series receives a value representing its absolute position bias. Typically, an absolute position bias is encoded into the input embedding before the input embedding is applied to the encoder. Absolute position bias is important, but it is somewhat limited on its own because it does not include relative position information, such as relative positioning of a token related to other tokens within a given series.

FIG. 2 illustrates the second type of position bias, relative position. Relative position is an assignment of the relative distance between pairs of tokens within a series. Relative position assigns each token multiple values which represents the distance between the token and every other token in the series (e.g. a token pair). For example, a system or method which utilizes relative position will assign a value of 1 for a token pair which includes a first token 201 and a second token 202, a value of 2 for a token pair which includes the first token 201 and a third token 203, a value of −1 for a token pair which includes the second token 202 and the first token 201 and so on until every pair of tokens within a series has been assigned a value representing the distance between the tokens.

Some systems introduce the absolute position bias at the input encoding layer. However, the manner in which existing systems and methods insert the absolute position bias to existing attention mechanisms is problematic because the position information is embedded along with content information. The merger of independent pieces of information, such as the position and content information, creates noise within the encoder processing and therefore limits the accuracy (e.g. relevance and usefulness) of the resulting pre-trained models.

Another problem with existing systems arises because they apply significantly more weight to content information than the position bias information, such that the position bias information is practically nominal. One reason for this is that existing systems add content information and position information to the attention mechanism during the encoder processing, thereby entangling the bias to the content information and which significantly weakens the consideration given to the position information during the encoder processing. This weakening is further magnified due to the iterative processing by multiple dependent encoding layers of the transformer, which has the effect of muting the position information relative to the much stronger signals of the content information. In such systems, the position bias information can be completely negated or lost during the encoding processing performed by the multiple layers of the transformer, thereby limiting the accuracy and effectiveness of the underlying model to make accurate and relevant predictions with bias information.

In view of the foregoing, there is an ongoing needed and desire for improved systems and techniques for disentangling the position bias information from the content information during processing of NLP and/or Natural Language Understanding (NLU) models, such as, but not limited to PLM models that utilize a BERT-like architecture, and to thereby enable more relevant consideration of the relative position of each token in the series that are analyzed by the corresponding model(s).

There is also an ongoing need and desire for improved techniques to perform self-training with the models to even further facilitate the models' abilities to make accurate predictions with increased convergence and reduced computing power.

It will be appreciated that the subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments generally relate to computing systems and methods configured to facilitate processing of NLPs, such as transformer-based pre-trained language models (PLM) and other related models by disentangling position information and content information within the self-attention matrices of the PLM and other related models. Disclosed embodiments also relate to computing systems and methods configured to facilitate self-training of PLM models and other related models with multi-step decoding to improve pre-training convergence.

Some embodiments include a computing system that is configured to account for position bias while using a transformer, the computer system comprising one or more processors and one or more computer-readable hardware storage devices with instructions that when executed by the one or more processors cause the computing system to initiate and or perform a series of processes with the transformer. These processes include the computing system identifying a plurality of tokens in a series to be encoded and obtaining the transformer that is configured with an encoder that comprises a self-attention sub-layer and a feed forward sub-layer.

In some instances, the computing system embeds the plurality of tokens to generate input data and the computing system applies the input data to the encoder. The computing system also generates and applies an attention score to the self-attention sub-layer, wherein the attention score disentangles a position bias embedding from a content embedding associated with the tokens in the series that is being processed. In some instances, the computing system disentangles the position bias embedding from the content embedding by applying an attention weight comprising a summation of three attention score components with disentangled projection matrices, namely, a content-to-content component, a content-to-position component, and a position-to-content component. Although not required, some embodiments also include a position-to-position component in the summation used for the attention weight.

Some embodiments include a computing system that is configured to improve pre-training convergence while encoding data with a transformer, the computing system comprising one or more processors and one or more computer-readable hardware storage devices containing instructions that when executed by the one or more processors cause the computing system to perform various acts associated with the pre-training. These acts include the computing system identifying a plurality of tokens in a series to be encoded. The computing system then obtains a transformer with an encoder comprising a plurality of encoding layers. The computing system also embeds the plurality of tokens to generate input data that is applied to the encoder.

In some instances, the computing system applies an output of the final encoding layer as additional input to the final encoding layer to generate new output from the final output layer. In some embodiments, the computing system also obtains a query vector or matrix from the output of the final encoding layer and applies the query vector or matrix as additional input to the final encoding layer to generate new output from the final encoding layer.

Some embodiments include methods of encoding data with a transformer that is configured to account for position bias as well as to improve pre-training convergence, incorporating various combinations of the disclosed embodiments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter Additional features and advantages will be set forth in the description which follows and in part, will be obvious from the description or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a table demonstrating the performance of several natural language processors in standard tests.

FIG. 4 illustrates a table demonstrating the performance of several natural language processors in standard tests.

DETAILED DESCRIPTION

Figure 1:
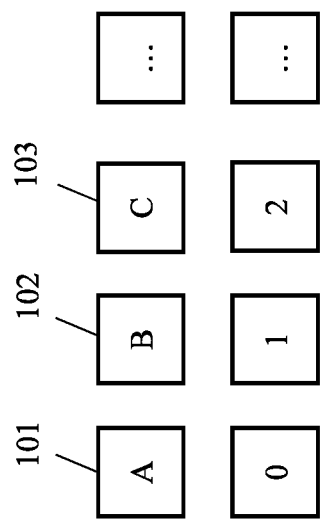
FIG. 1 illustrates absolute position of tokens in a series.

The embodiments disclosed herein introduce multiple techniques for improvement of a pre-trained language model that utilizes a transformer to encode data. At least one disclosed embodiment proposes a new model structure for pre-training a language model, referred to as Decoding-enhanced BERT with disentangled attention (DeBERTa).

As described herein, some of the disclosed embodiments capture the position information of a token within a series while encoding data with a transformer. Some embodiments disentangle content and positional information of each token within a series by applying an attention score that independently accounts for relative position bias embedding and content embedding. In at least one embodiment, the computing system disentangles the position bias embedding from the content embedding by applying an attention weight which is a summation of three attention score components with disentangled projection matrices, namely, a content-to-content component, a content-to-position component, and a position-to-content component. Although not required, in some instances, a position-to-position component is also included in the attention weight summation.

Some disclosed embodiments utilize self-training to pre-train and modify the models generated by the encoder. In some instances, self-training is conducted through masked language modeling. In some embodiments, the self-training is enhanced by utilizing a multi-step decoding to better reconstruct masked tokens and improve pre-training convergence. In at least one embodiment, multi-step decoding is performed by obtaining output from a final layer of an encoder and applying the output as additional input to the final layer of the encoder to generate new output.

The disclosed embodiments provide technical benefits in the industry by providing improved methods and systems for utilizing a transformer to facilitate the analysis of sequential dependencies existing between tokens in a series being processed by machine learned models. These embodiments disentangle the position information from the content information within the attention matrices used by the machine learned models so that the models can account for position information more accurately and to thereby improve the relevance and usefulness of the models.

Technical benefits of the disclosed embodiments also include improvements in the pre-training convergence that occurs during self-training of the models by utilizing a multi-step decoder layer with a transformer that is better equipped to reconstruct masked tokens more effectively (e.g. by using less resources), than existing systems, and to thereby improve the self-training processes applied with/to the corresponding models.

Some embodiments combine one or more features of the foregoing embodiments to further promote improvements in both pre-training efficiency (e.g. convergence) and model effectiveness (e.g. accuracy, relevance, or usefulness) for downstream tasks.

FIGS. 3 and 4 highlight some of the performance gains that can be made with the disclosed embodiments, DeBERTa, relative to other conventional PLMs that are used to perform NLP tasks. FIG. 3 specifically contrasts performance of DeBERTa (the disclosed embodiment that disentangles position information) with the performance of other conventional BERT type large models. FIG. 4, on the other hand, contrasts the performance of DeBERTa with other conventional BERT type base models. Testing has shown, for example, that the disclosed embodiments can consistently and significantly outperform RoBERTa$_{large}$ on a wide range of established tasks. For example, the disclosed embodiments demonstrate improvement in the MNLI by 0.9% (90.2 vs. 91.1), the SQuAD V2 task by 2.3% (88.4 vs. 90.7), and the RACE task by 3.6% (83.2% vs. 86.8%).

Figure 5:
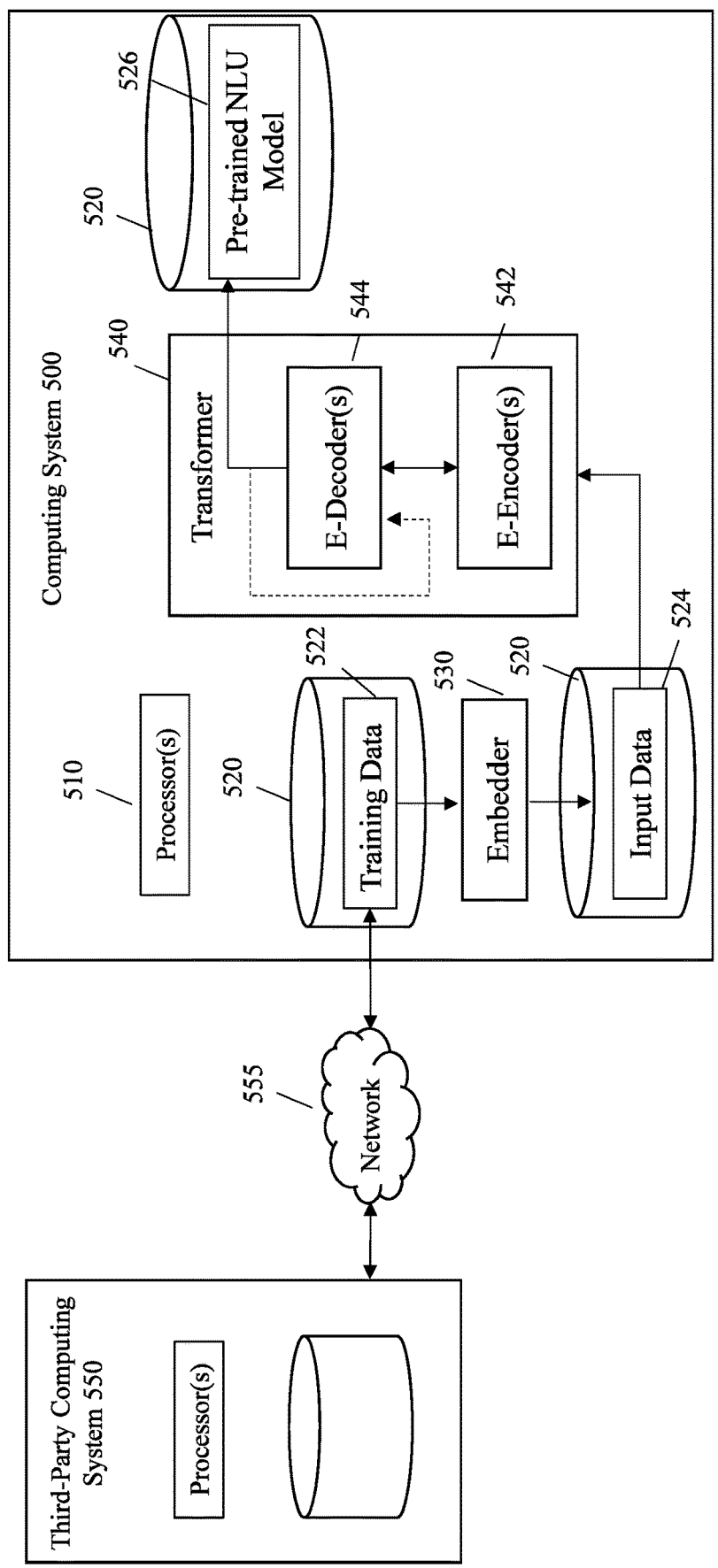
FIG. 5 illustrates a computer system that includes and/or that can be used to perform the disclosed functionality.

FIG. 5 illustrates one implementation of a computer system that incorporates and/or that can be used to perform the disclosed embodiments, such as, generating an NLP or PLM by encoding data with a transformer. As shown, the computing system 500 includes one or more processors 510 and one or more hardware storage devices 520 storing computer executable instructions that, when executed by the one or more processors 510, cause the computing system to perform the functionality described herein.

In some instances, the computing system 500 obtains training data 522 comprising a plurality of tokens, which may include any combination of words, non-words, parts of words, or multiple words (including phrases and sentences). In some instances, the tokens are text or speech. In some instances, the computing system 500 obtains the plurality of tokens from a third-party computing system 550 through a network connection 555. In some embodiments, the training data 522 comprises publicly available resources, such as Wikipedia, or a dataset of books from a third party source.

The computing system 500 then identifies the plurality of tokens from the training data 522 and embeds the plurality of tokens with an embedder 530 to generate input data 524. The input data, in some instances, comprises embedded tokens, with each embedded token comprising a vector or matrix representation of the original token. Additionally, in some embodiments, the input data comprises multiple vectors or matrices which represent different aspects of the token, such as, a position embedding vector or a content embedding vector of the token. In some instances, the input data for a token comprises a single vector which is a summation of the token's content embedding and position embedding. The computing system 500 then applies the input data 524 to a transformer 540 with one or more encoders 542, 544.

The transformer 540 with one or more encoders 542, 544 processes the input data to generate an output, as disclosed in more detail in reference to FIGS. 6, 7, 9, and 10. In some embodiments, the output is applied to a softmax layer which is used to predict missing tokens by generating probabilities of one or more likely desired tokens. In some instances, the computing system utilizes the output generated by the transformer to build or train an PLM model. For example, the output from the transformer may be used to provide a pre-trained language model 526.

Figure 6:
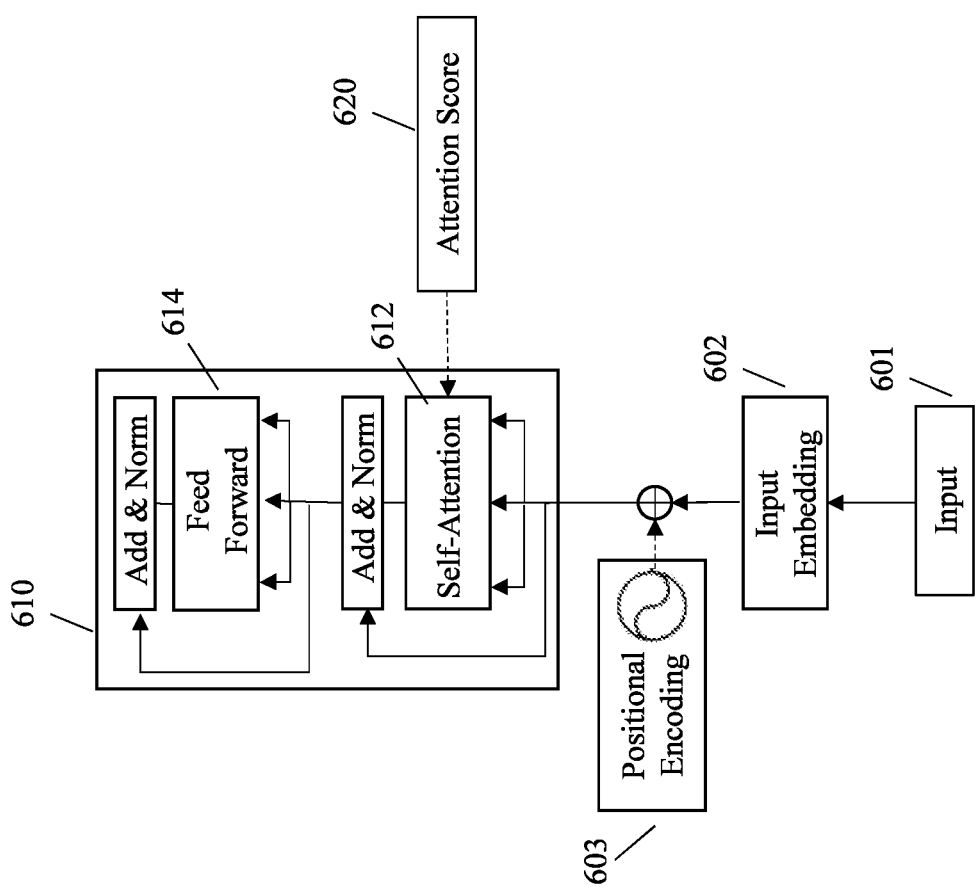
FIG. 6 illustrates an encoder of a simplified transformer.

FIG. 6 illustrates a simplified encoder 610 that may be utilized by the computing system 500. A computing system identifies a plurality of tokens in a series as input 601 to be embedded as the input embedding 602.

The input embedding 602 is applied to the encoder 610 comprising a self-attention sub-layer 612 and a feed-forward sub-layer 614. The self-attention sub-layer 612 includes an attention mechanism that generates and applies an attention score 620. In some instances, the encoder 610 includes a plurality of encoding layers, each with its own feed-forward sub-layer and self-attention sub-layer. Encoders with multiple encoding layers will be discussed in more detail in regard to FIGS. 9 and 10.

In some systems, position information is encoded as the positional encoding 603. In these systems, the positional encoding 603 is embedded with the input embedding 602 prior to applying the input embedding 602 to the encoder 610.

The attention score in a typical transformer is calculated as shown below:

$$Q = W_q H$$
$$K = W_k H$$
$$V = W_v H$$
$$A = \frac{Q_Q K^T}{\sqrt{d}}$$
$$H_o = \text{softmax}(A)V$$

where $H \in R^{N \times d}$ represents hidden input vectors; $H_o \in R^{N \times d}$ represents the outputs of self-attention including content embedding; Q, K, and V denotes the query, key, and value vectors or matrices; $W_q, W_k, W_v \in R^{d \times d}$ represent the projection matrices; $A \in R^{N \times N}$ represents the attention matrix; N represents the length of the input token sequence; and d represents the dimensions of the hidden state.

However, conventional systems that apply the position embedding to the input data, prior to applying the input data to the encoder, using the aforementioned attention score formulas, weaken the position information, as discussed previously.

To address the potential weakening of the positional information, some embodiments apply the positional bias information within the encoder 610 by applying the position information at the self-attention sub-layer 612 through the use of attention score 620 which incorporates both content and position embedding to the self-attention sub-layer 612. Some existing systems attempt to provide disentanglement of the attention score 620 by dividing the attention score 620 into four components (e.g., a content-to-content attention score, a content-to-position attention score, a position-to-content attention score, and a position-to-position attention score). Some existing systems implement an attention score that utilizes position information in one or more attention score components. However, even though the attention score 620 has been at least partially disentangled into four components, those components still utilize the same projection matrices. Even more particularly, the same projection matrices $W_q$ and $W_k$ are used for both the content embeddings and the position embeddings. Thus, the content information and position information still remain relatively entangled with this conventional implementation.

At least one embodiment, the attention weight is calculated using the formula below. In at least one embodiment, the embedder 530 generates two embedded input vectors which represent a single token, a content vector $\{H_i\}$ and a relative position vector $\{P_{i,j}\}$. In this manner, the attention weight of a word pair can be calculated as the sum of four attention score components, namely, content-to-content, content-to-position, position-to-content, and position-to-position, as shown below:

$$A_{i,j}=\{H_i,P_{i|j}\}\times\{H_j,P_{j|i}\}^T=H_iH_j^T+H_iP_{i|j}^T+P_{i|j}H_j^T+P_{i|j}P_{j|i}^T$$

As described in the foregoing, a content embedding signal is typically stronger than a position embedding signal. Therefore, by utilizing the same projection matrices for both content encoding and position encoding, the positional bias information may be overwhelmed or lost within an encoder, particularly by an encoder that utilizes stacked encoding layers which, thereby, weakens the sequence dependency of the attention mechanism and effectively limits the accuracy of the resulting model. Therefore, improvements over such conventional systems are needed.

Figure 7A:
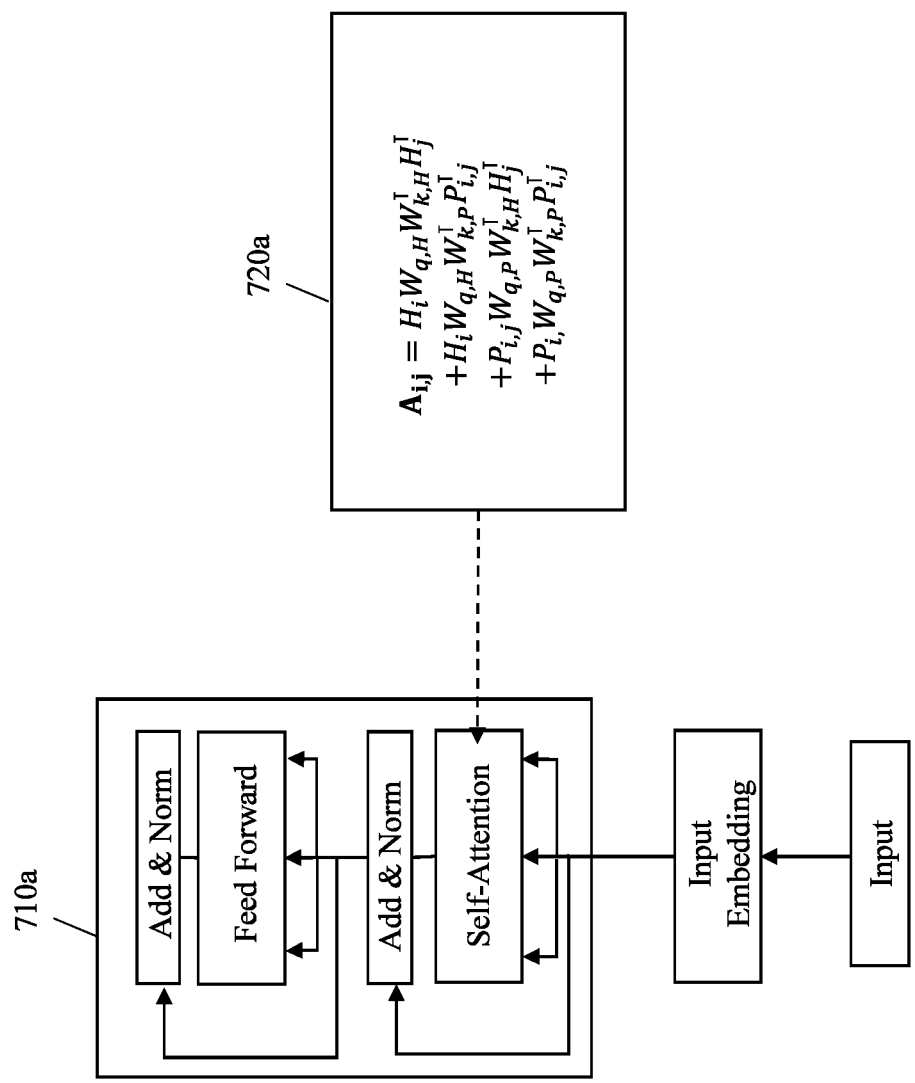
FIG. 7A illustrates an encoder of a transformer where position bias is disentangled at the self-attention level.

FIG. 7A illustrates one embodiment of an improved encoder 710*a* that effectively disentangles the content embedding from the position embedding within the attention score 720*a*. The attention score 720*a* is fully disentangled in this disclosed implementation by introducing learn-able projection matrices specific to both the content embedding (e.g., $W_{q,X}$, $W_{k,X}$), as well as the position embedding (e.g., $W_{q,P}$, $W_{k,P}$)/

Figure 2:
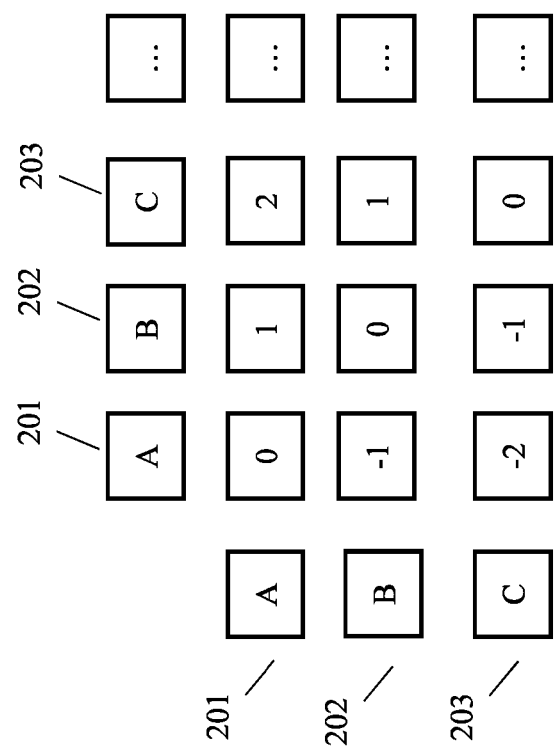
FIG. 2 illustrates relative position of tokens in a series.

The attention score 720*a* of FIG. 7A, for example, with a full set of disentangled projection matrices, is calculated with the following formula, in which $P_{i,j}$ denotes the relative distance (e.g. relative position) between tokens i and j, such as referenced in FIG. 2:

$$A_{i,j}=H_iW_{q,H}W_{k,H}^TH_j^T+H_iW_{q,H}W_{k,P}^TP_{i,j}^T+P_{i,j}W_{q,P}W_{k,H}^TH_j^T+P_iW_{q,P}W_{k,P}^TP_{i,j}^T$$

As shown in this implementation, the attention score 720*a* is a summation of four distinct attention score components, namely, a content-to-content component $H_iW_{q,H}W_{k,H}^TH_j^T$, a content-to-position component $H_iW_{q,H}W_{k,P}^TP_{i,j}^T$, a position-to-content component $P_{i,j}W_{q,P}W_{k,H}^TH_j^T$, and a position-to-position component $P_iW_{q,P}W_{k,P}^TP_{i,j}^T$. By utilizing this set of distinct components, the attention score is more fully disentangled relative to prior systems and in such a manner that the consideration of the position information will persist throughout the encoding processing, independently and disentangled from the corresponding content information, and without being negated or muted during the processing due to entanglement within the transformer.

Additionally, in at least one embodiment, the computing system applies learn-able relative position encoding instead of fixed sinusoid encoding. In at least one embodiment $P_{i,j}$ is a learn-able parameter. In at least one embodiment, the fourth component $(P_iW_{q,P}W_{k,P}^TP_{i,j}^T)$ is a global position-to-position bias which is independent of the content embedding. It will be appreciated that this independent global position-to-position bias is novel from other models that incorporate relative position bias. In at least one additional or alternative embodiment, the global position-to-position bias utilizes the absolution position of token i, denoted as $P_i$ in the application of the aforementioned formula.

In some embodiments, the encoder 710*a* generates an output that can be utilized by the computing system to train or build a PLM model. In some embodiments, the encoder output is applied to a decoder to make NLP predictions and/or to perform other NLP or machine learning operations.

In at least one embodiment, the attention weight utilizes a maximum relative distance for the relative position embedding and shown in the formula below:

$$\delta(i,j)=\begin{cases} 0 & \text{for } i-j \le -k \\ 2k-1 & \text{for } i-j \ge k \\ i-j+k & \text{others} \end{cases}$$

where k represents the maximum relative distance and $\delta(i,j) \in [0, 2k)$ represents the relative distance from token i to token j.

Figure 7B:
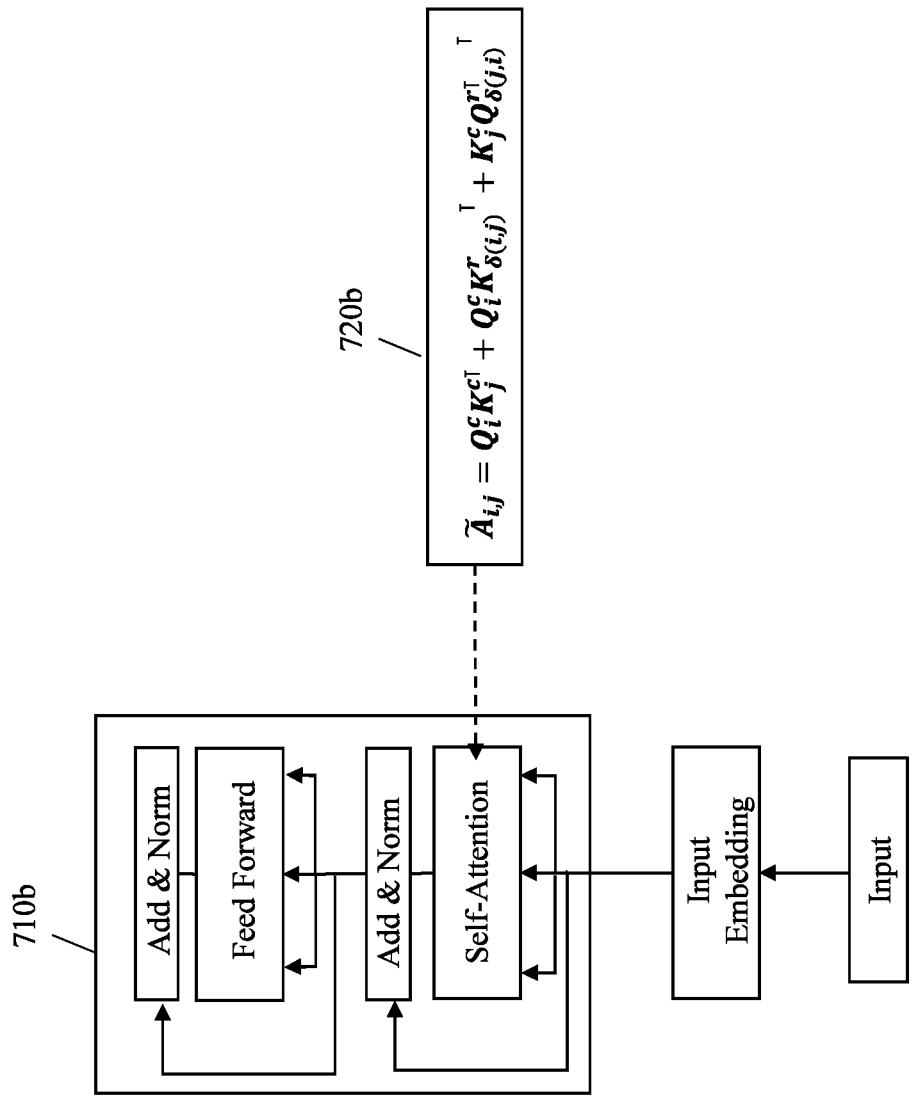
FIG. 7B illustrates an encoder of a transformer where position bias is disentangled at the self-attention level.

FIG. 7B illustrates a related embodiment in which the encoder 710*b* utilizes an attention score 720*b* that omits the global position-to-position component from the summarization of the other three components. For instance, the disentangled self-attention score in this embodiment is calculated by the following formula:

$$\tilde{A}_{i,j}=Q_i^cK_j^{cT}+Q_i^cK_{\delta(i,j)}^{rT}+K_j^cQ_{\delta(j,i)}^{rTT}$$

where where $\tilde{A}_{i,j}$ is the element of attention matrix, representing the attention score from token i to token j. In addition, $Q_i^c$ is the $i^{th}$ row of $Q_c$, $K_j^c$ is the $j^{th}$ row of $K_c$, $K_{\delta(i,j)}^r$ is the $\delta(i,j)^{th}$ row of $K_r$ with regard to relative distance $\delta(i, j)$, and $Q_{\delta(j,i)}^r$ is the $\delta(i, j)^{th}$ row of $Q_r$ with regard to relative distance $\delta(i, j)$.

In this formula, $Q_c=HW_{q,c}$, $K_c=HW_{k,c}$, $V_c=HW_{v,c}$, $Q_r=HW_{q,r}$, $K_r=HW_{k,r}$, wherein $Q_c$, $K_c$ and $V_c$ are the projected content vectors generated using projection matrices $W_{q,c}$, $W_{k,c}$, $W_{v,c} \in R^{d \times d}$, respectively, and $P \in R^{2k \times d}$ represents the relative position embedding vectors shared across all layers (i.e. staying fixed during forward propagation), and $Q_r$ and $K_r$ are the projected relative positions vectors generated using projection matrices $W_{q,r}$, $W_{k,r} \in R^{d \times d}$, respectively.

Finally, in at least one embodiment, a scaling factor of $$\frac{1}{\sqrt{3d}}$$

on $\tilde{A}$, is also applied to stabilize the model training for large-scale PLMs, as represented by $$H_o = \text{softmax}\left(\frac{\tilde{A}}{\sqrt{3d}}\right)V_c.$$

With regard to the calculation of attention weight and attention score, it is desirable in some instances to reduce the space complexity and memory requirements needed by the computing system 500 to complete the attention weight or attention score computations. In some embodiments, improvements to the space complexity and reductions in memory requirements include causing the computing system 500 to refrain from storing a relative position embedding for each query. Instead, in some instances, the computing system utilizes one or more subsets of the key, value, or query vectors (e.g. K, V, or Q) to extract the relative position embedding and calculate the attention score for all queries. In at least one embodiment, the computing system 500 utilizes the relative distance $\delta$ as an index in extracting attention weights while utilizing a subset of either the key, value, or query vector. An example of an efficient implementation of a disentangled attention, and a corresponding algorithm, is included in U.S. Provisional Patent Application Ser. No. 63/035,315, filed on Jun. 5, 2020, and entitled "DEBERTA: DECODING-ENHANCED BERT WITH A DISENTANGLED ATTENTION," which has been incorporated by reference in its entirety.

Figure 8:
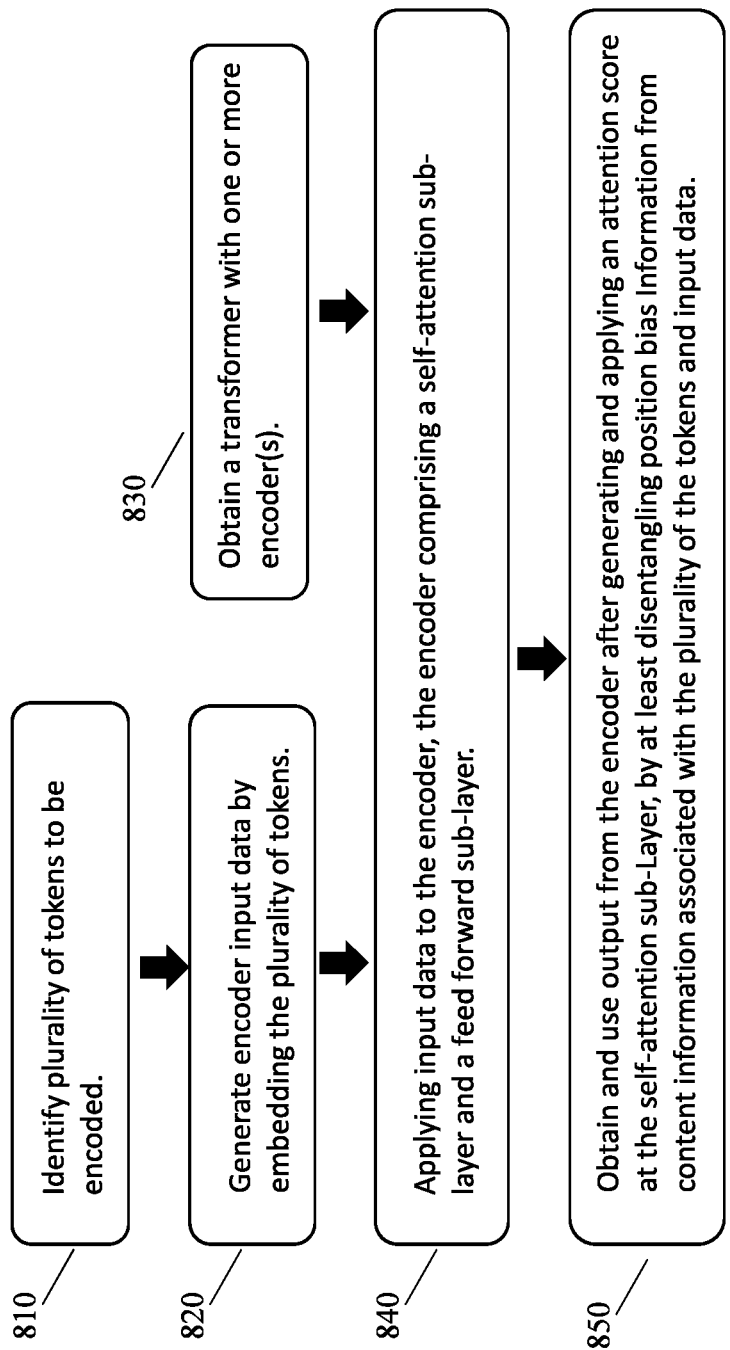
FIG. 8 illustrates a flowchart of acts associated with methods performed by a computing system.

FIG. 8 illustrates a flow chart of the various acts associated with the disclosed systems and methods where the computing system disentangles position information from content information in the self-attention sublayer 720b while encoding data with a transformer.

Figure 11:
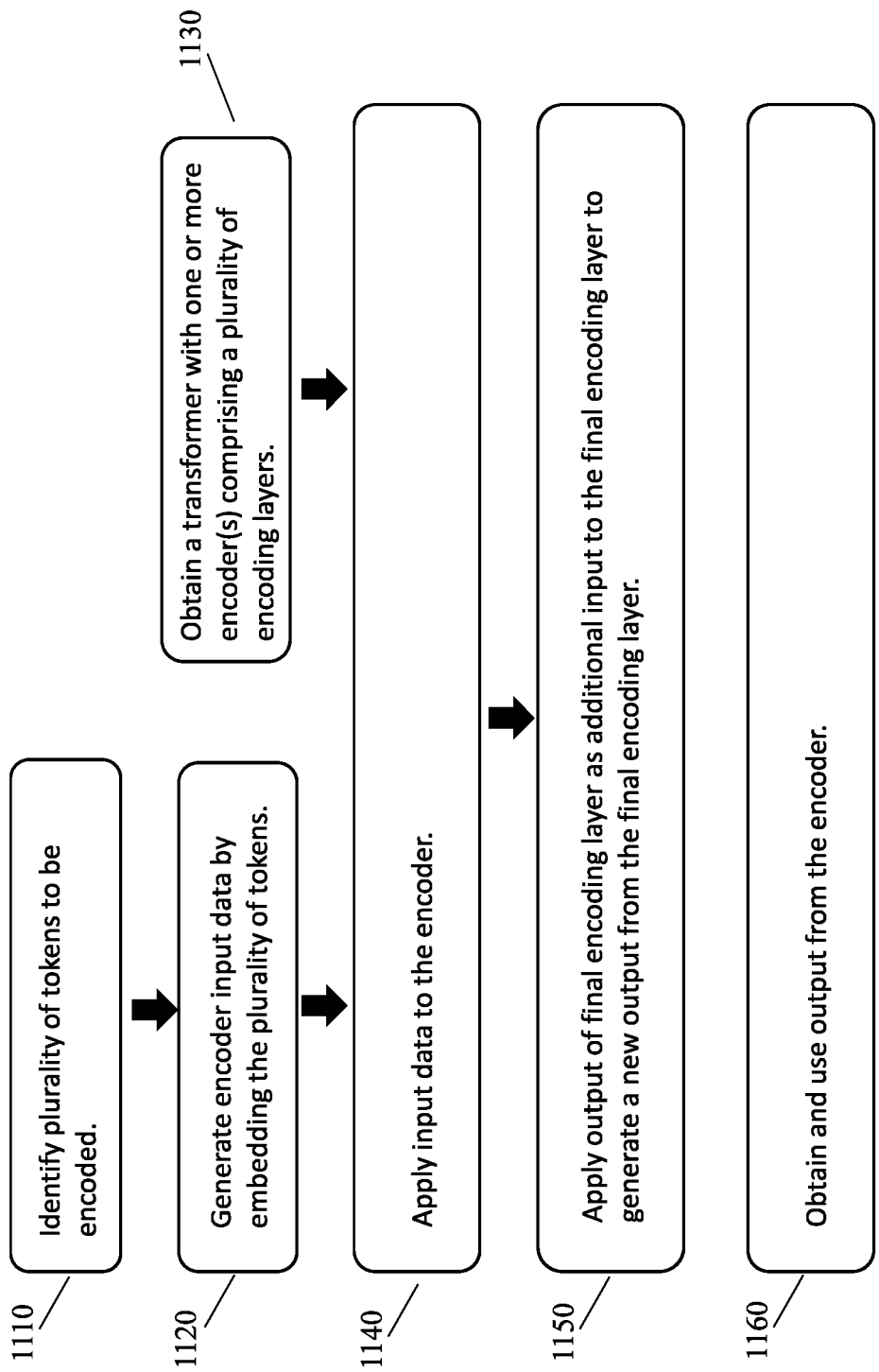
FIGS. 11-12 illustrate flowcharts of acts associated with methods performed by a computing system.
Figure 12:
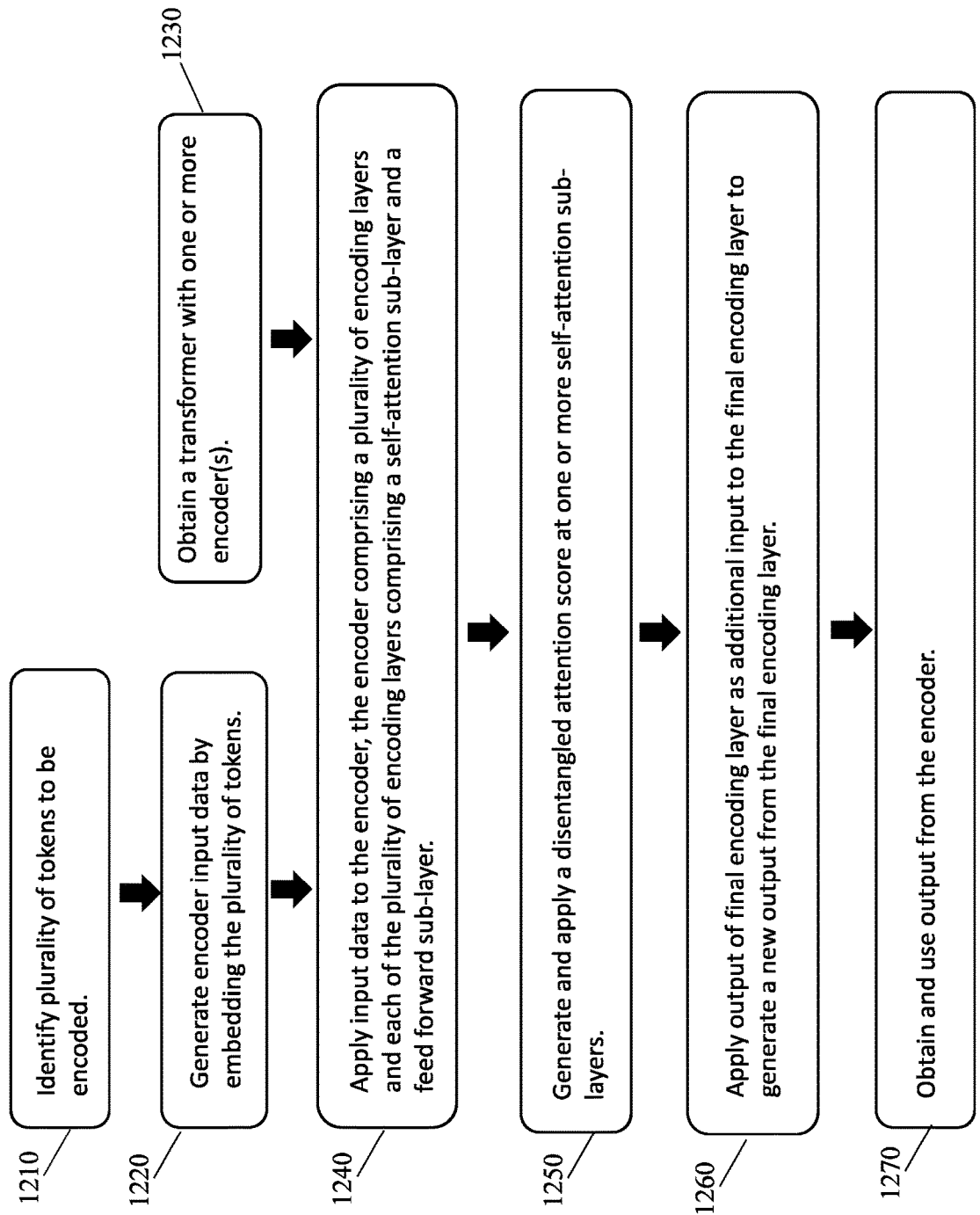

It will be appreciated, with regard to the flow charts shown in FIGS. 8, 11 and 12, that the following discussion now refers to a number of methods and method acts that may be performed. Although the method acts may be discussed in a certain order or illustrated in a flow chart as occurring in a particular order, no particular ordering is required unless specifically stated or required because one act is dependent on another act being completed prior to the act being performed.

As shown, the disclosed embodiments include a computer system identifying a plurality of tokens to be encoded (act 810) and embedding the plurality of tokens to generate input data (act 820). The computing system will obtain a transformer with one or more encoders (act 830). The computing system then applies the input data to the encoder, the encoder comprising a self-attention sub-layer and a feed-forward sub-layer (act 840). Finally, the computing system obtains and uses the encoder output, after generating and applying an attention score to the self-attention sub-layer, by at least disentangling position bias information from content information that is associated with the input data (act 850).

Figure 9:
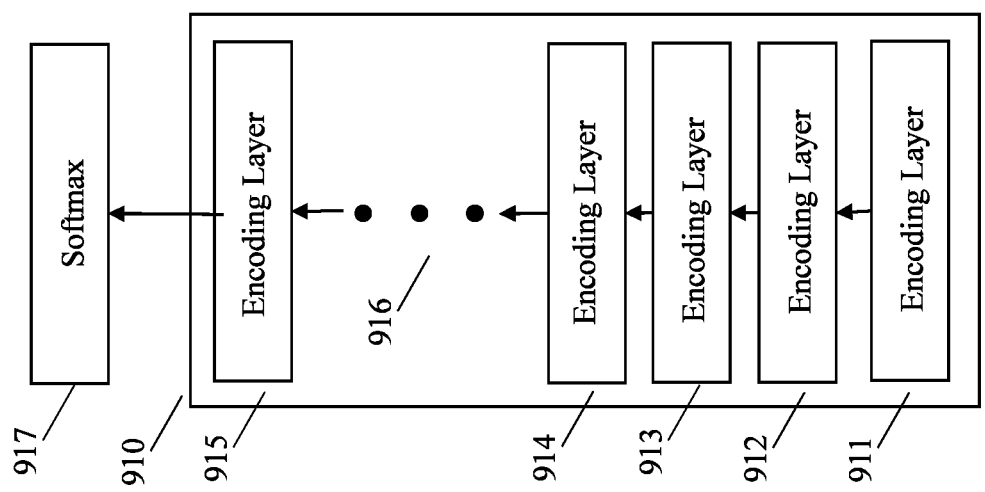
FIG. 9 illustrates an encoder composed of multiple encoding layers.

FIG. 9 illustrates one embodiment of an encoder 910 that comprises a plurality of encoding layers 911, 912, 913, 914, 915, etc. Each encoding layer 911, 912, 913, 914, 915 comprises a self-attention sub-layer and a feed-forward sub-layer as disclosed in regard to FIGS. 6 and 7. The ellipsis 916 indicate that the encoder could have any number of encoding layers. In some embodiments, the encoder has six encoding layers. In some embodiments the encoder has twelve encoding layers. In some embodiments the encoder has 24 encoding layers.

In some embodiments, the first encoding layer 911 applies as input, the input embedding as illustrated in FIG. 6 and described in the corresponding discussion. In some embodiments each encoding layer (912, 913, 914, 915, etc.) following the first encoding layer 911 applies, as input, the output of the encoding layer below it. For example, encoding layer 912 applies, as input, the output of encoding layer 911 and so forth. In some embodiments, one or more encoding layers may apply as input, or as additional input, the output of an any encoding layer.

In many instances, a computing system may utilize the output of the final encoding layer 915 to self-train a model produced by the transformer. For example, BERT utilizes the output of final encoding layer 915 to self-train the model. Generally, BERT utilizes a Masked language model (MLM) to enables a computing system to learn bi-directional representations of natural language and to self-train the PLM. A standard BERT pre-training consists of applying final hidden vectors from the final encoding layer 915, the hidden vectors corresponding to the masked tokens, to an output softmax 917 over vocabulary to reconstruct the masked tokens. The computing system then trains and updates the model based on the accuracy (e.g. correct and incorrect predictions) of the predictions.

The following discussion is a more detailed description of how BERT reconstructs masked tokens in self-training. The typical output of final encoder layer l∈ [0, L) is shown below:

$$\bar{O}^l = \text{Attention}(H^{l-1}W_q^l, H^{l-1}W_k^l, H^{l-1}W_v^l)$$

$$O^l = \text{LayerNorm}(\text{Linear}(\bar{O}^l) + H^{l-1})$$

$$H_l = \text{LayerNorm}(\text{PosFNN}(O^l) + O^l)$$

where L is the total number of transformer layers and $H^l = \{h_i^l\}$ is the output of the $l^{th}$ layer with $h_i^l$ corresponding to hidden state of the $i^{th}$ token.

For example, the objective of the computing system is to reconstruct corrupted tokens $\{\hat{x}_i\}$ from $\tilde{X}$, utilizing the output of the final encoding layer 915, where a portion of a sequence X is randomly corrupted as $\hat{x}_i$, and now represented as $\tilde{X}$ (e.g. the corrupted version of X). Masked token reconstruction is shown below:

$$\max_\theta \log p_\theta(X|\tilde{X}) = \sum_{i \in K} \log p_\theta(\hat{x}_i = x_i | \tilde{X}) = \sum_{i \in K} \log \frac{e^{h_i^{L-1} \cdot e_i}}{\sum_j e^{h_i^{L-1} \cdot e_j}}$$

where K is the set of indices of masked tokens in the sequence, $e_i$ is the embedding of $i^{th}$ token in the sequence, $e_j$ is the embedding of $j^{th}$ token in the whole vocabulary, and $h_i^{L-1}$ is the hidden state of masked token in the output of last transformer layer.

Some embodiments are directed at an Enhanced Mask Decoder (EMD) that improves pre-training of the PLM by introducing task-specific decoding layers in order to mitigate mismatch between pre-training and fine-tuning (e.g. task-specific training of a pre-trained model). An EMD is a task-specific decoder designed to reconstruct masked token of an MLM. In some embodiments, the EMD has a plurality of decoding layers. In at least one embodiment, one or more hidden vector(s) that were output from a decoder layer are reapplied to the decoder layer to generate a new output from the decoder layer. In some embodiments, when the desired final output is probabilities, the output of the decoding layers is applied to a softmax layer.

In some embodiments, features of BERT and EMD are combined, so that the resulting model has an encoder-decoder transformer structure with multiple layers. For example, in some instances, the transformer has 12 layers with 12 attentions heads. In other instances, the transformer has 24 layers and 16 attention heads. In such instances, the encoder may have the same quantity of layers as the decoder or more layers than the decoder.

Figure 10:
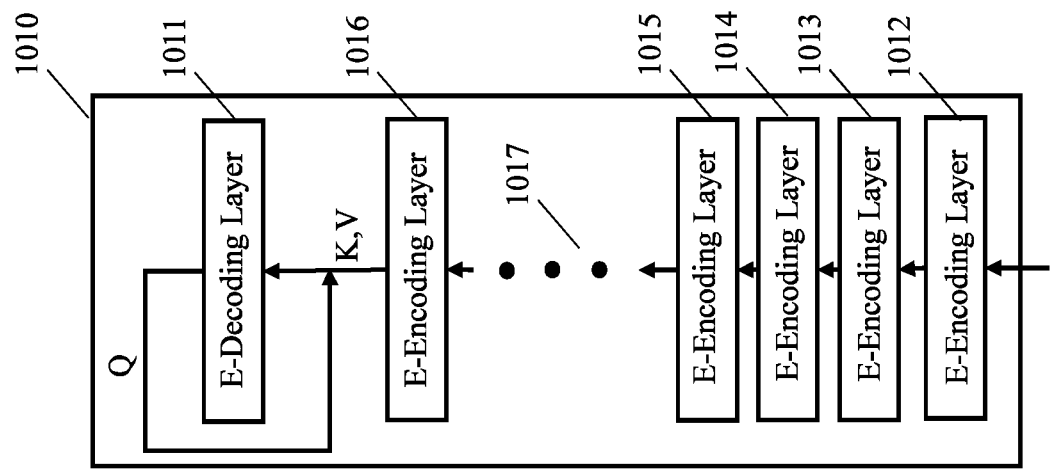
FIG. 10 illustrates an encoder with a final decoding layer.

FIG. 10 illustrates one embodiment of a transformer architecture with an EMD. In at least one embodiment, the first N−1 layers of the encoder are e-encoder layers 1012, 1013, 1014, 1015, and 1016. In this configuration, N denotes the total number of encoding layers within the encoder 1010 and the final layer is an EMD or an e-decoder layer 1011. Ellipsis 1017 illustrate other embodiments that may have any number of encoding layers 1012, 1013, 1014, 1015, 1016. In at least one embodiment, there are eleven e-encoding layers. In at least one embodiment, there are 23 e-encoding layers 1012, 1013, 1014, 1015, 1016.

In at least one embodiment, the e-decoder 1011 is used to improve the self-training of the PLM model. In at least one embodiment, the e-decoder 1011 is used to improve the self-training of an MLM. In at least one embodiment, the e-decoder is used to produce token-wise contextual embeddings that are used to reconstruct the masked tokens in the MLM.

In at least one embodiment, some or all of the output of the e-decoding layer 1011 is reapplied to the e-decoding layer 1011 as additional input. Therefore, in at least one embodiment, the e-decoding layer 1011 obtains its inputs from the output of the decoding layer 1011, as well as the output of from one or more encoding layers (e.g. encoding layer 1016). In at least one embodiment, the computing system 500 obtains output from the e-decoder layer 1011 comprising hidden vectors, correlating to the masked tokens, and applies one or more hidden vectors as additional input to the e-decoder 1011 to generate new output from the e-decoder 1011.

In some embodiments, the computing system obtains one or more projected content vectors and/or projected relative position vectors from the output of the e-decoder 1011 and applies one or more projected content vectors and/or projected relative position vectors to the input of e-decoder 1011 to generate new output from the e-decoder 1011. For example, in one embodiment the computing system obtains a queries matrix (Q) from the output of the e-decoding layer 1011 and computing system 500 obtains the key (K) and value (V) matrix from the final E-encoder layer 1016. The Q K, and V matrices are then applied as input to the e-decoding layer 1011. In this manner, the Q output of the e-decoder layer 1011 can be used by the computing system to generate a new Q from the e-decoder layer, or the Q output can be used to by the computing system to self-train an PLM model. In at least one embodiment the Q output from the e-decoder is utilized to reconstruct masked tokens for an MLM.

In some embodiments, the system iteratively applied the Q output of the e-decoder as additional input to the e-decoder 1011. This may occur numerous times (e.g., 2, 3, 4 ... 10 ... 20, 20+ times, or any number of times). In this manner, the same K and V of the final E-encoder layer 1016 will be applied to the e-decoder in each iteration of the multi-step method, while the Q output from the e-decoder 1011 will update during each iteration. Each updated Q is applied as additional input to the E-decoding layer 1011 to generate a new output from the e-decoder 1011. In at least one embodiment, the Q output from the e-decoder 1011 is applied only once to the E-decoder as additional input to generate new e-decoder output.

In at least one embodiment, only the hidden state of masked tokens $h_i^{L-1}$ are used during the calculation of the MLM loss. By ignoring the last two components of the formula, the output is actually a weighted sum of the output of the e-encoder layers 1012, 1013, 1014, 1015, 1016 with an attention score as the weight. From this point of view, at least one embodiment includes a multi-step e-decoder that causes the e-encoding layers 1012, 1013, 1014, 1015, 1016 to learn a better representation of the input sequence $X=x_i$ and that causes the e-decoding layer 1011 to reconstruct the corrupted tokens more accurately through multiple steps as shown in FIG. 10.

During this multi-step e-decoder can utilize the following formula:

$$Q^{s-1} = H_{de}^{s-1}$$

$$\overline{O}^s = \text{Attention}(Q^{s-1}W_q^{L-1}, H_{en}^{n-1}W_k^{L-1}, H_{en}^{n-1}W_v^{L-1})$$

$$O^s = \text{LayerNorm}(\text{Linear}(\overline{O}^s) + Q^{s-1})$$

$$H_{de}^s = \text{LayerNorm}(\text{PosFNN}(O^s) + O^s)$$

where $H_{de}^s = \{h_{dei}^s\}_{i \in K}$ is the output of decoding step s, $H_{de}^{s-1}$ is the output of the last layer of encoder with a total layers of n=L−1, and when s=0.

When this formula is applied to the pre-trained model for downstream task adaptation, at least one embodiment uses one-step task head to query over the output of last encoder layer, $H^{n-1}$.

In at least one embodiment, the e-decoder layer 1011 is used to reconstruct the masked tokens of an MLM in denoise mode, as opposed to the typical auto-regressive mode. "Denoise mode" is the masked language modeling training method described earlier, and "auto-regressive mode" is a training method where an NLP or PLM attempts to predict a missing token sequentially.

In at least one embodiment, the output of the e-decoder 1011 is applied to a softmax layer to provide probabilities and reconstruct masked tokens.

The multi-step e-decoding layer 1011 has multiple technological advantages over existing systems. First, when compared with the single-step approach, the final output Q has a deeper understanding of the original K and V from varied and different perspectives, similar to the idea of multi-step reasoning. This can lead to better self-training, such as a better prediction of the masked tokens and improves convergence of the model. Second, it can push more objective-oriented information back to the static K and V during training and modification of the model (e.g. back-propagation). Because K and V have interacted with Q multiple times in the forward propagation, the accumulating gradients of K and V better capture the feedback signal in the objective function from all the steps. The multi-step e-decoder layer 1011 can help the computing system to learn a better representation for all the e-encoder layers.

The following discussion related to the specifics of how an MLM is typically implemented and embodiments which improve on the MLM. Generally, BERT utilizes MLM by masking fifteen percent (15%) of tokens or words within a series, processing the language of the series, attempting to predict the masked words, and then unmasking the words and updating the model to make better predictions. Most of the randomly selected masked tokens are replaced with a [MASK] token. However, ten percent (10%) of the tokens selected for masking remain unchanged in order to mitigate the mismatch between pre-training (self-training) and fine-tuning. However, this method is limited by information leaking (i.e. predicting a masked token conditioned on the token itself). Accordingly, improvements over such masking techniques is desired.

Disclosed embodiments can provide improvements over the foregoing techniques, in some instances, by replacing a portion of the output from the final layer e-encoder 1016 with new inputs. For instance, in at least one embodiment, the portion of the output of layer 1016 is replaced with the corresponding absolute position embedding vectors prior to being applied to the e-decoder layer 1011, wherein the portion of the output of layer 1016 corresponds to the masked (and unchanged) tokens in an MLM. This can help prevent the aforementioned information leaking.

FIG. 11 illustrates a flow chart of the various acts associated with the disclosed methods in which the computing system utilizes a multi-step e-decoding layer 1011 while encoding data with a transformer to improve self-training of an PLM model.

The computing system first identifies a plurality of tokens to be encoded (act 1110) and embeds the plurality of tokens to generate encoder input data (act 1120). The computing system also obtains a transformer with one or more encoders (act 1130). The computing system then applies the input data to the encoder comprising a plurality of encoding layers (act 1140). The computing system then applies an output of a final encoding layer as additional input to the final encoding layer to generate a new output from the encoding layer (act 1150). Finally, the computing system will obtain and use the new output from the encoder (act 1160).

FIG. 12 illustrates a flow chart of the various acts associated with the disclosed methods in which the computing system disentangles position information from content information in the self-attention sublayer 720b and utilizes a multi-step E-decoding layer 1011 while encoding data with a transformer to capture position information and improve self-training of an PLM model.

The computing system first identifies a plurality of tokens to be encoded (act 1210) and embeds the plurality of tokens to generate encoder input data (act 1220). The computing system also obtains a transformer with one or more encoders (act 1230). The computing system then applies the input data to the encoder comprising a plurality of encoding layers where each of the plurality of encoding layers comprise a self-attention sub-layer and a feed-forward sub-layer (act 1240). The computing system will then generate and apply an attention score to one or more self-attention sub-layer for one or more encoding layer by at least disentangling position bias information from content information that is associated with the input data (act 1250). The computing system then applies an output of a final encoding layer as additional input to the final encoding layer to generate a new output from the encoding layer (act 1260). Finally, the computing system will obtain and use an output from the encoder (act 1270).

It will be appreciated, with regard to the foregoing, that the disclosed embodiments may be incorporated in and/or by a computer system that includes one or more processors and computer-readable media such as computer memory or other hardware storage devices that store computer-executable instructions that when executed by one or more processors cause the various disclosed functions to be performed.

The disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are hardware storage media. Computer-readable media that carry computer-executable instructions are transmission media. Thus, by way of example, and not limitation, embodiments of the invention can comprise at least two distinctly different kinds of computer-readable media: (1) physical computer-readable hardware storage media and (2) transmission computer-readable media, which are distinct and different from each other.

Physical computer-readable hardware storage media includes RAM, ROM, EEPROM, CD-ROM or other optical disk storage (such as CDs, DVDs, etc.), magnetic disk storage or other magnetic storage devices, or any other hardware storage devices which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to account for position bias while encoding data with a transformer to improve pre-training convergence of the transformer, the computing system comprising:
    one or more processors; and
    one or more computer-readable hardware storage devices
        that store computer executable instructions that are executable by the one or more processors to cause the computer system to at least:
apply input data comprising tokens having position bias embedding to an encoder of a transformer;
generate and apply an attention weight for disentangling the position bias embedding and for modifying one or more learnable parameters used by the encoder, the attention weight comprising each of:
a first attention component based on a content embedding of the first token in a token pair as well as a content embedding of a second token in the token pair;
a second attention component based on the content embedding of the first token in the token pair and a relative position embedding of the first and second tokens in the token pair; and
a third attention component based on the relative position embedding of the first and second tokens in the token pair and the second content embedding of the second token in the token pair; and
modify the one or more learnable parameters used by the encoder based on output generated by the encoder applying the attention weight to the input data to facilitate an improvement in the pre-training convergence of the transformer.

2. The computing system of claim 1, wherein the attention weight further includes a fourth attention component comprising a product of an absolute position embedding of the first token in the token pair, the first learn-able position parameter, the second learnable position parameter, and the relative positional embedding of the first and second tokens in the token pair.

3. The computing system of claim 1, wherein the encoder includes a plurality of encoding layers within the encoder.

4. The computing system of claim 3, wherein a final encoding layer of the encoder is a task specific decoding layer, and wherein the computing system applies the output of the task specific decoding layer as new input to the task specific decoding layer for one or more iterations in order to generate new output from the task specific decoding layer.

5. The computing system of claim 4, wherein the computing system applies one or more hidden vector outputs associated with masked tokens from the task specific decoding layer as additional input to the task specific decoding layer to generate additional new output from the decoding layer.

6. The computing system of claim 4, wherein the computing system applies a query vector output of the task specific decoding layer as additional input to the task specific decoding layer to generate additional new output from the decoding layer.

7. The computing system of claim 1, wherein the computing system refrains from applying position bias embedding prior to the encoder.

8. The computing system of claim 1, wherein the computing system generates a separate attention weight for each of a plurality of token pairs.

9. The computing system of claim 8, wherein the computing system applies a maximum relative distance between tokens in each token pair.

10. A storage device having stored computer-executable instructions which are executable by one or more processors of a computing system for causing the computing system to implement a method for improving pre-training convergence while encoding data with a transformer, the computing system comprising:
one or more processors; and
one or more computer-readable hardware storage devices that store computer executable instructions that are executable by the one or more processors to cause the computer system to at least:
identify a plurality of tokens to be encoded from a sequence;
obtain a transformer that includes an encoder with a plurality of encoding layers;
embed the plurality of tokens to generate input data;
apply the input data to the encoder by at least disentangling position bias embedding from content embedding associated with the plurality of tokens; and
apply output of a final encoding layer as additional input to the final encoding layer for one or more iterations in order to generate new output from the final encoding layer to facilitate convergence of the transformer during training of the transformer.

11. The computing system of claim 10, wherein the computing system where the final encoding layer is a decoding layer.

12. The computing system of claim 11, wherein a portion of the tokens are masked prior to generating the input data and a wherein the output of the final encoding layer corresponding to portion of the token that are masked prior to generating the input data is replaced with a corresponding absolute position embedding vector prior to being applied as the additional input.

13. The computing system of claim 11, wherein the computing system applies one or more hidden vector outputs from the decoding layer as the additional input, wherein the one or more hidden vectors correspond to tokens that are masked prior to generating the input data.

14. The computing system of claim 12, wherein the computing system applies a query vector output of the decoding layer as additional input to the decoding layer for one or more iterations in order to generate new output from the final decoding layer.

15. The computing system of claim 10, wherein the encoder includes a self-attention sub-layer and a feed forward sub-layer.

16. The computing system of claim 15, wherein the computing system generates and applies an attention score at the self-attention sub-layer for disentangling position bias embedding from content embedding associated with the plurality of the tokens.

17. The computing system of claim 16, wherein the attention score comprises a summation of at least:
a first attention score component comprising a product of a content embedding of a first token in a token pair, a first learn-able content parameter, a second learn-able content parameter, and a content embedding of a second token in a token pair;
a second attention score component comprising a product of the content embedding of the first token in the token pair, the first learn-able content parameter, a first learn-able position parameter, and a relative position embedding of the first and second tokens in a token pair; and
a third attention score component comprising a product of the relative position embedding of the first and second tokens in the token pair, a second learn-able position parameter, the second learn-able content parameter, and the second content embedding of a second token in a token pair.

18. The computing system of claim 17, wherein the computing system generates a separate attention score for each token pair of a plurality of token pairs.

19. A method of using encoding data with a transformer that is configured to account for position bias and facilitate a convergence of the transformer, the method including:
- identifying a plurality of tokens to be encoded from a sequence;
- obtaining a transformer that includes an encoder, comprising a plurality encoding layers within the encoder wherein each of the plurality of encoding layers includes a self-attention sub- layer and a feed forward sub-layer;
- embedding the plurality of tokens to generate input data, the plurality of tokens having position bias embedding;
- applying the input data to the encoder;
- generating and applying an attention weight for disentangling the position bias embedding and for modifying one or more learnable parameters used by the encoder; and
- modifying the one or more learnable parameters used by the encoder based on output generated by the encoder applying the attention weight to the input data to facilitate convergence of the transformer.

20. The method of claim 19, wherein the attention weight comprises a summation of at least the following:
- a first attention component based on a content embedding of the first token in a token pair as well as a content embedding of a second token in the token pair;
- a second attention component based on the content embedding of the first token in the token pair and a relative position embedding of the first and second tokens in the token pair; and
- a third attention component based on the relative position embedding of the first and second tokens in the token pair and the second content embedding of the second token in the token pair.

* * * * *